Feb. 7, 1967  W. J. SACKETT, JR  3,302,788
APPARATUS FOR CLASSIFYING MATERIALS
Filed Aug. 5, 1963  3 Sheets-Sheet 2
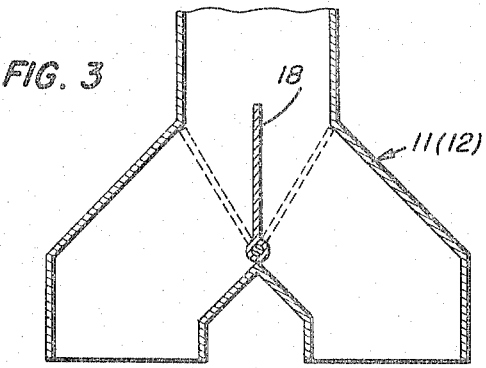
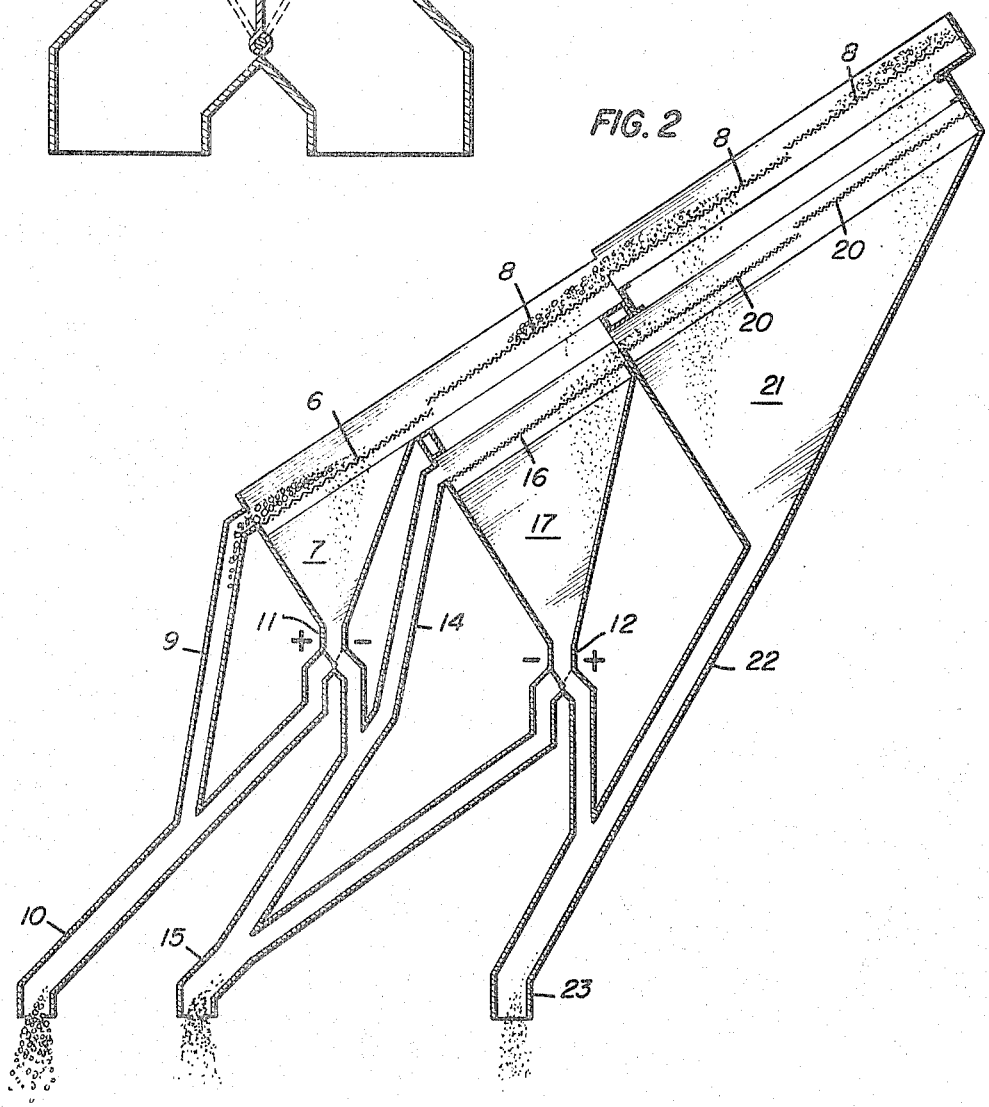
INVENTOR
Walter J. Sackett, Jr.
BY Walter G. Finch
ATTORNEY

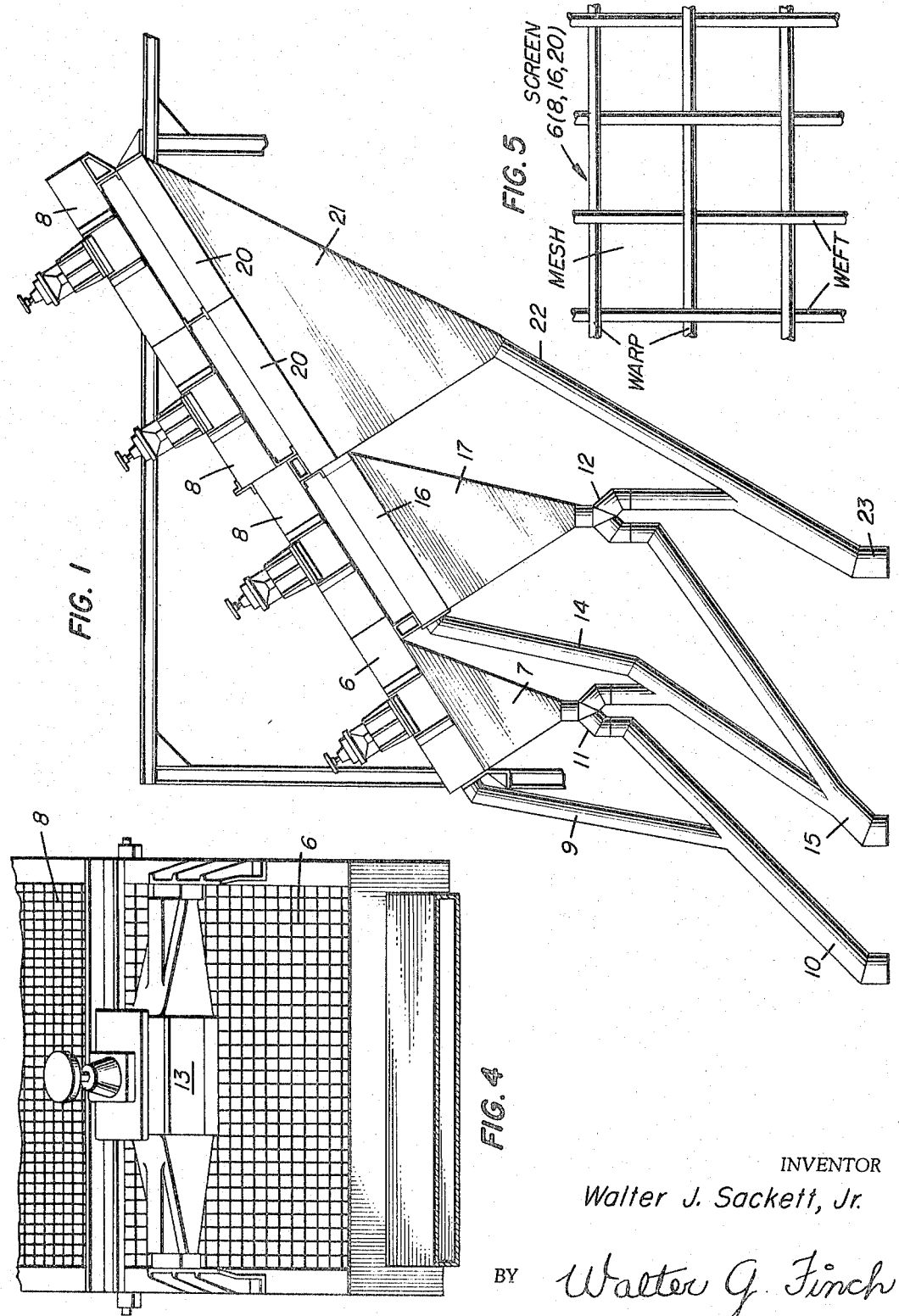

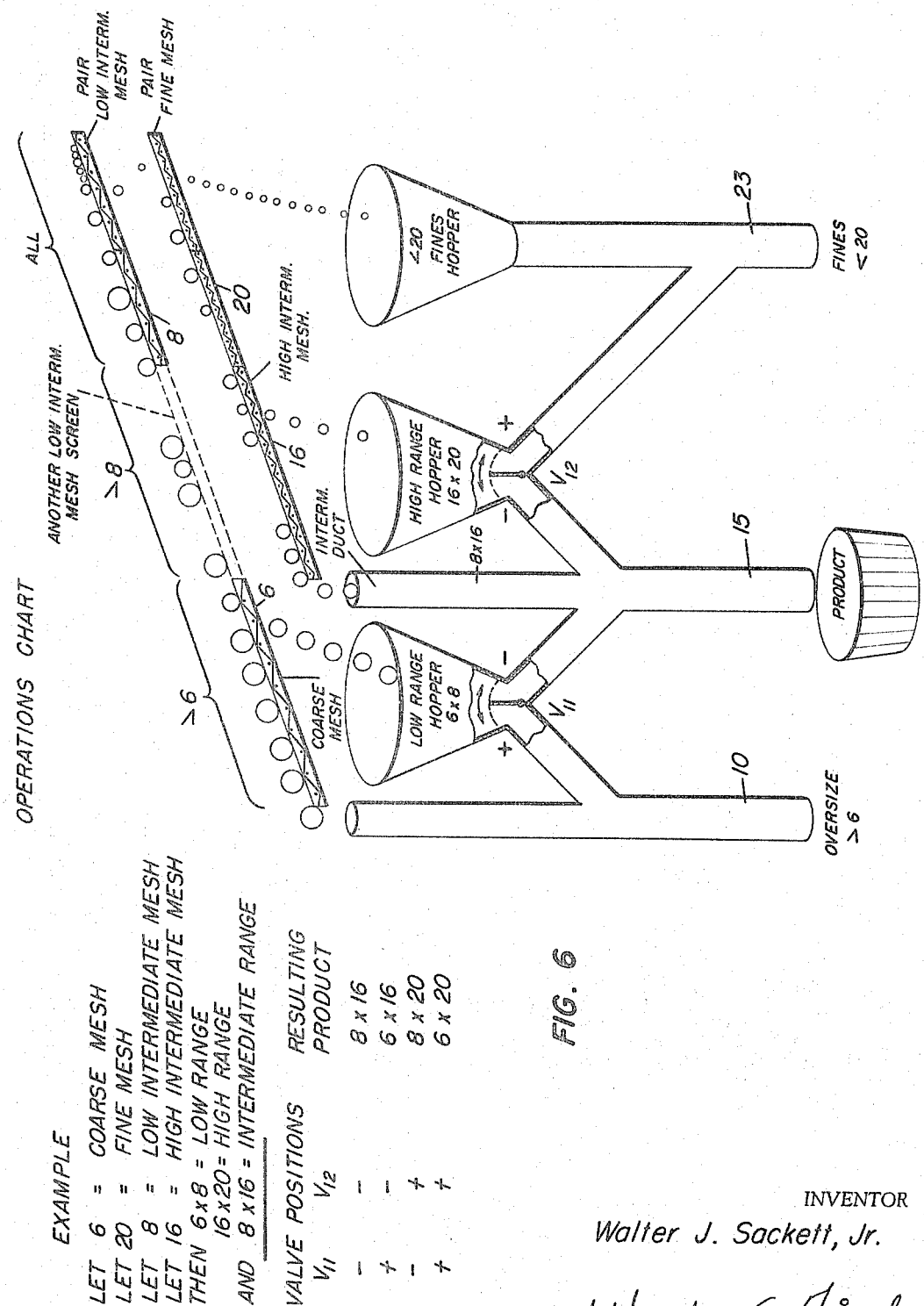

United States Patent Office 3,302,788
Patented Feb. 7, 1967

3,302,788
APPARATUS FOR CLASSIFYING MATERIALS
Walter J. Sackett, Jr., Severna Park, Md., assignor to The A. J. Sackett & Sons Co., Baltimore, Md., a corporation of Maryland
Filed Aug. 5, 1963, Ser. No. 299,921
3 Claims. (Cl. 209—355)

This invention relates generally to classifying apparatus, and more particularly it pertains to an apparatus for obtaining several ranges in grades of particulate material from a continuously operating screening plant by simple valving.

In artificial fertilizer plants, especially, it is of prime importance to carefully grade the granules in the final product. Thus farm fertilizer is generally of a different particle size than lawn and garden fertilizer for example.

It is an object of this invention, therefore, to provide an arrangement of screens, hoppers, and valves in a gravity classifier so that several choices of particle size range are possible for the final product without shutting down the equipment.

Another object of this invention is to provide a selective choice screening apparatus wherein the rejected material from such several choices is automatically channeled to the proper recycling ducts for reprocessing in an economical manner.

Other objects and attendant advantages of this invention will become more apparent and understood from the following detailed specification and accompanying drawings in which:

FIG. 1 is a side elevation of a screen device incorporating features of this invention;

FIG. 2 is a schematic diagram illustrating the flow of material through the screen device of FIG. 1;

FIG. 3 is a vertical section of a two-way type valve;

FIG. 4 is a plan view looking down onto one of the upper screen elements;

FIG. 5 is an enlarged fragmentary view of a screen; and

FIG. 6 is an isometric view of the screen device of FIG. 1 illustrating material flow for certain screen sizes.

Referring now to the details of the drawings, the screen device according to my invention consists of a series of screen reference numerals 8, 8, 8, and 6 in that order from upper to lower lying in an inclined plane. Directly beneath this series of screens 8, 8 and 8 (but not 6) there are mounted in a parallel plane, screens in descending series, reference numerals 20, 20, and 16, respectively.

Material to be classified is introduced upon the uppermost screen 8. All screens lying in each common plane effectively communicate their overflow from one screen to the next screen in order of arrangement.

The undersides of screens 20 are confined by the mouth of a common fines hopper 21. The underside of screen 16 is confined by the mouth of a high range hopper 17. The mouth of a low range hopper 7 encompasses the underside of screen 6.

The adjectives fines, high range and low range are applied to the hoppers 21, 17 and 7 to identify the range of relative particle size of the screenings which fall through their associated screen meshes.

In a woven screen by adjusting the weft and warp count, the mesh can be of such size as to pass finer particles and retain coarse particles about a given size as best illustrated in FIG. 5. The screenings or the coarse particles can then be further screened by another mesh screen and the result will be a product having particles in a range intermediate the two mesh sizes.

For convenience in understanding the operation of this screen device, the screens will be called by relative coarseness of mesh, i.e., reference numeral 6 is a coarse mesh screen, reference numeral 20 is a fine mesh screen, reference numeral 8 is a low intermediate mesh screen and reference numeral 16 is a high intermediate mesh screen.

The coarse material retained by the lowermost or coarse mesh screen 6 is discharged into a coarse duct 9 and thence to an oversize recycling chute 10.

Likewise, the fines hopper 21 discharges into a fines duct 22 and thence to a fines chute 23 for recycling through the raw material plant, not shown.

The material retained by the intermediate range mesh screen 16 discharges into an intermediate range duct 14 and thence to a product chute 15.

The low range hopper 7 can discharge either into the oversize chute 10 or the product chute 15. The high range hopper 17 can discharge either into the fines chute 23 or the product chute 15. This is accomplished in both cases by two-way type valves, as indicated in FIG. 3, a low range valve 11 connected with low range hopper 7 and a high range valve 12 connected with the high range hopper 17.

The screens are individually or collectively shaken in operation by the usual vibrators reference number 13 secured to the screens as best illustrated in FIGS. 1 and 4. This vibration of the screens helps the flow of material thereover and reduces the tendency to clog.

When the valve vane 18 is thrown to the left, material is channeled to the right and inversely. With respect to the discharge of either valve 11 or 12 into the product chute 15, the legend plus (+) will be used with respect to the position of valve vane 18. If the valve discharges into a recycling chute (either oversize or fines as the case may be) the legend minus (—) will be used as indicated in FIG. 2.

Referring now to FIG. 6, let it be assumed as an example of operation the screen mesh sizes which correspond to their reference numbers; screen 8 having 8 meshes per unit area etc.

It is apparent that falling through screen 8 will be all sizes of particle finer than 8. These then impinge on screen 20 and all particles finer than 20 fall through it into the fines hopper 21. It is customary to designate the range of particle size by a product sign. Thus, the material rolling off the top of screens 20 onto screen 16 contains the range 8 x 20.

On screen 16, a range of particle size 16 x 20 falls through into high range hopper 17. An intermediate range particle size 8 x 16 is retained and enters intermediate range duct 14.

Going now to the top plane of 2 screens (8 and 6) any small material which failed to fall through the first two screens 8 now has the opportunity of dropping through the third screen 8 from the top to be sorted into ranges 8 x 16 or 16 x 20 for appropriate duct or hopper collection. The residue on top of the third screen 8 passes to screen 6 where the range 6 x 8 drops through to low range hopper 7. All oversize particles remaining on screen 6 discharge into coarse duct 9.

The operator has the choice of four combinations in the setting of valves 11 and 12. Consequently, he can get four ranges of particle size from the product chute 15 as shown by the following table:

| Valve Positions | | Resulting Product, Range |
|---|---|---|
| Ref. 11 | Ref. 12 | |
| — | — | 8 x 16 |
| + | — | 6 x 16 |
| — | + | 8 x 20 |
| + | + | 6 x 20 |

It should be noted that the change-over from one range size to another is instantly accomplished without stopping the flow at any point and without delay in changing screens.

At the same time the change-over is made a corresponding change is made in the re-cycling fines chutes or oversize chutes so no material is wasted or required to be stored.

Obviously many modifications and variations of the present invention are possible in light of the above teachings. It is, therefore, to be understood that within the scope of the appended claims the invention may be practiced otherwise than as specifically described.

What is claimed is:

1. Apparatus for grading sizes of particulate material, comprising an upper inclined series of screens arranged with the first screen thereof to initially receive said particulate material, a lower inclined series of screens arranged to receive the screenings from said upper series of screens, each screen of said upper and lower series of screens being arranged to receive the overflow of the preceding screen of its respective series, the numerical representation of the screen size of the first screen of each said upper and lower series of screens being greater than that of the last screen of its respective series, first means receiving the screenings from said first screen in said lower series of screens, whereby the fine sizes of said particulate material are isolated, second means receiving the overflow from said last screen of said upper series of screens, whereby the coarse sizes of said particulate material are isolated, third means receiving the overflow from said last screen of said lower series of screens to isolate an intermediate size of said particulate material, fourth means for receiving the respective intermediate screenings from said lower series of screens, fifth means for receiving other intermediate screenings from said upper series of screens, first control means directing the intermediate screenings of said lower series of screens between said first means and said third means, and second control means directing the intermediate screenings of said upper series of screens between said second means and said third means.

2. The apparatus for grading sizes of particulate material as recited in claim 1, wherein the first screen of said lower series of screens receives the screenings from the first screen of said upper series of screens.

3. The apparatus for grading sizes of particulate material as recited in claim 1 wherein the intermediate screening of said upper series of screens is coarser than said intermediate size isolated by said third means.

References Cited by the Examiner

UNITED STATES PATENTS

| | | | |
|---|---|---|---|
| Re. 12,459 | 2/1906 | Anderson | 209—313 X |
| 693,019 | 2/1902 | Holmes | 209—313 X |
| 2,106,008 | 1/1938 | Kuhrts | 209—313 X |
| 2,225,909 | 12/1940 | Greunder | 209—311 |
| 3,016,203 | 1/1962 | Sears | 209—315 X |
| 3,077,266 | 2/1963 | Plumb | 209—240 X |

FOREIGN PATENTS 883,425   2/1943   France.

HARRY B. THORNTON, *Primary Examiner.*

R. HALPER, *Assistant Examiner.*